3,637,696
THEOPHYLLINE AND THEOBROMINE SUBSTITUTED AMINES

Walter Otto, Vienna, Austria, assignor to Gerot Pharmazeutika Dr. Walter Otto K.G., Vienna, Austria
No Drawing. Filed Aug. 21, 1967, Ser. No. 661,824
Claims priority, application Austria, Aug. 23, 1966, A 7,999/66
Int. Cl. C07d 57/42, 57/48
U.S. Cl. 260—256  9 Claims

ABSTRACT OF THE DISCLOSURE

A substituted amine having the formula

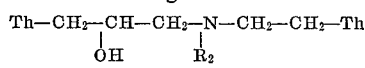

wherein each Th is 7-theophylline or 1-theobromine and $R_2$ is selected from alkyl and hydroxyalkyl groups, wherein each of said alkyl and hydroxyalkyl groups is a straight or branched chain alkyl containing 1–4 carbon atoms.

SUMMARY OF THE INVENTION

The present invention provides the novel substituted amines and their acid salts as defined hereinbefore.

The preferred amines of the invention are those having the formula

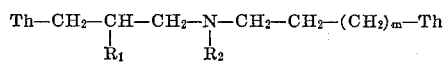

wherein $R_1$ is hydrogen or a hydroxyl group.

Those substituted amines in which $R_2$ is an alkyl, an isoalkyl, or a hydroxy substitute thereof, are preferably those in which the alkyl group is a lower alkyl group.

The substituted amines of the present invention are prepared by reacting an amine having the formula

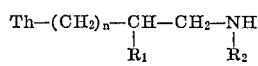

with a compound having the formula

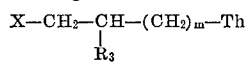

wherein X is a halide, or X and $R_3$ together form an epoxy group. The other symbols have the meanings designated hereinbefore. When the substituted amine produced in accordance with the foregoing is a secondary amine, i.e., when $R_2$ is initially hydrogen, the secondary amine may be reacted with a compound having the formula $R_2Y$, in which $R_2$ is as defined hereinbefore except that it may not be hydrogen, and Y is a reactive group which will react with the hydrogen of the secondary amine to replace said hydrogen with said $R_2$ group. Y is preferably a halide or an epoxy group.

DESCRIPTION OF THE PREFERRED EMBODIMENTS

The reaction of the amine reactant with the "X" terminated reactant is preferably carried out in the presence of a solvent. The reaction goes readily particularly under reflux conditions. The novel substituted amine products may be recovered by conventional means such as first evaporating the solvent and then recrystallizing from a solvent such as ethanol.

The acid salts of the amines are readily produced in accordance with conventional techniques. Such inorganic acids as hydrochloric acid and sulphuric acid may be used to produce the respective salts. Similarly, such organic acids as maleic acid, acetic acid, nicotinic acid, citric acid, tartaric acid, etc., may be used to prepare their respective salts. The pharmaceutically accepted salts of both organic and inorganic acids which are customarily accepted for pharmaceutical purposes are readily prepared from the novel substituted amines of the present invention and may be utilized in the form of these salts.

The following examples further illustrate the invention.

EXAMPLE 1

12.13 grams of β-chloroethyltheophylline (0.05 mol) are heated with 16.72 grams of γ-amino-β-hydroxypropyltheophylline (0.075 mol) in 50 ml. isopropanol under reflux. After completion of the reaction it is concentrated by evaporation and the residue recrystallized from ethanol and then reacted with an excess of ethylene chlorhydrin. In this way there is obtained 7-β-hydroxypropyltheophylline-(7-ethyl-theophylline)-(β-hydroxyethyl)-amine; M.P. 154–156° C. Yield 59.5%.

EXAMPLE 2

11.15 grams theophylline ethylamine (0.05 mol) are reacted with 17.72 grams of epoxypropyltheophylline (0.075 mol), in 50 ml. of isopropanol, in a manner similar to Example 1. The resultant reaction product is treated with isobutylchloride. In this way there is obtained (7-ethyltheophylline) - (7-β-hydroxypropyltheophylline)-(isobutyl)-amine, M.P. 179–181° C. Yield: 82%.

EXAMPLE 3

13.97 grams of 7-ethyltheophylline-n-butylamine (0.05 mol) are reacted with 17.72 grams epoxypropyltheophylline (0.075 mol) in 50 ml. isopropanol in a manner similar to Example 1. In this way there is obtained 7-ethyltheophylline - (7 - β - hydroxypropyltheophylline)-butylamine, M.P. 143–146° C. Yield 78.2%.

EXAMPLE 4

5.59 grams of 7-ethyltheophylline-(isobutyl)-amine (0.02 mol) and 8.18 grams chlorohydroxypropyltheophylline (0.03 mol) are dissolved in 75 ml. isopropanol. Thereupon 1.2 grams of NaOH are slowly added and heating is effected for 20 hours under reflux. The solution while still hot is filtered in order to remove the NaCl which has separated out. The precipitate is recrystallized from ethanol. There is obtained (7-ethyltheophylline)-(7-β-hydroxypropyl-theophylline)-(isobutyl) amine, M.P. 179–181° C.

EXAMPLE 5

5.35 grams of 7-ethyltheophylline-(β-hydroxyethyl)-amine (0.02 mol) and 8.18 grams of chlorohydroxypropyltheophylline (0.03 mol) are reacted in a manner similar to Example 4. In this way there is obtained 7-β-hydroxypropyltheophylline - (7 - ethyl - theophylline)-(β-hydroxyethyl)-amine, M.P. 154–156° C.

EXAMPLE 6

5.59 grams of 7-ethyltheophylline-(n-butyl)-amine (0.02 mol) are reacted with 8.18 grams of chlorohydroxypropyl-theophylline (0.03 mol) in a manner similar to Example 4. There is obtained 7-ethyltheophylline-(β-hydroxy-propyltheophylline) butylamine, M.P. 143–146° C. The corresponding hydrochloride salt melts at 210–215° C.

EXAMPLE 7

12.13 grams β-chloroethyltheophylline (0.05 mol) are dissolved with 21 grams of 7-ethyltheophylline-n-butylamine (0.075 mol) in 75 ml. of isopropanol and reacted in a manner similar to Example 1. There is obtained 7-ethyltheophylline - (β - hydroxy - propyl-theophylline)-butylamine. M.P. 143–146° C.

EXAMPLE 8
PHARMACOLOGICAL ACTIVITY

| Substance | LD50, mg./kg., mouse I.v. | LD50, mg./kg., mouse Oral | Influencing of the time of passage to isolated guinea pig heart (Langendorff Test) |
|---|---|---|---|
| β-Hydroxypropyltheophylline | | | 1 |
| Th 601 | 650 | >4,000 | 1 |
| Th 611 | 155 | 1,750 | 3 |
| Th 612 | 270 | 2,300 | 3.6 |

NOTE.—Th 601=7-β-hydroxypropyltheophylline-(7-ethyl-theophylline)-β-hydroxyethyl-amine; Th 611=7-ethyltheophylline-(β-hydroxy-propyl-theophylline)-butylamine; Th 612=(7-ethyltheophylline)-(7-β-hydroxypropyltheophyline)-(isobutyl)-amine.

EXAMPLE 9

12.13 grams of β-ethylchlorotheobromine (0.05 mol) are heated with 16.72 grams of γ-amino-β-hydroxypropyltheobromine (0.075 mol) in 50 ml. isopropanol under reflux. After completion of the reaction it is slightly concentrated and the residue recrystallized from ethanol and thereafter reacted with a surplus of ethylene chlorhydrin. One obtains in this manner, 1-β-hydroxypropyltheobromine - (1-ethyltheobromine) - (β-hydroxyethyl) - amine, M.P. 168–172° C.

EXAMPLE 10

11.15 grams of theobromoethylamine (0.05 mol) are converted with 17.72 grams of epoxypropyltheobromine (0.075 mol) in 50 ml. isopropanol, on a procedure analogous to Example 9. The reaction product is then treated with isobutyl chloride. One obtains in this manner the (1-ethyltheobromine) - 1 - (β-hydroxypropyltheobromine)-(isobutyl)-amine, M.P. 187–189° C.

EXAMPLE 11

13.97 grams of 1-ethyltheobromine-n-butylamine (0.05 mol) are converted with 17.72 grams of epoxypropyltheobromine (0.075 mol) in 50 ml. isopropanol, using a procedure analogous to that of Example 9. One obtains in this manner the 1-ethyltheobromine-(1-β-hydroxypropyltheobromine)-butylamine, M.P. 149–151° C.

EXAMPLE 12

5.35 grams of 1 - ethyltheobromine-(β-hydroxyethyl)-amine (0.02 mol) and 8.18 grams of chlorohydroxypropyltheobromine (0.03 mol) are converted following a procedure analogous to that of Example 4. One obtains in this manner 1-β-hydroxypropyltheobromine-(1-ethyltheobromine)-(β-hydroxyethyl)-amine, M.P. 168–172° C.

EXAMPLE 13

5.59 grams of 1 - ethyltheobromine-(n-butyl)-amine (0.02 mol) are converted with 8.18 grams of chlorohydroxypropyltheobromine (0.03 mol) using a procedure analogous to that of Example 4. One obtains 1-ethyltheobromine - (β-hydroxypropyltheobromine) - butyl-amine, M.P. 149–151° C.

EXAMPLE 14

5.59 grams of 7-ethyltheophyllin-(isobutyl)amine (0.02 mol) and 8.18 grams of chlorohydroxypropyltheobromine (0.03 mol) are dissolved in 75 ml. isopropanol. Then one adds slowly thereto 1.2 grams of NaOH and heats for 20 hours under reflux. The hot solution is filtered to separate and remove NaCl. The precipitate is recrystallized from ethanol. One obtains (7-ethyltheophylline)-(1-β-hydroxypropyltheobromine)-(isobutyl)-amine, M.P. 185–191° C.

The procedure of the foregoing examples may be varied by using other solvents and by using other reactants within the scope of the group of reactants defined hereinbefore, e.g., $R_2$ may be hydroxyoctyl, and $m$ and/or $n=1$ or 2 when the other is 1.

The substituted amines (and their acid salts) of the present invention are useful as healing agents for mammals, particularly based on their effect in dilating heart blood vessels. They may be administered orally or parenterally in the treatment of coronary insufficiency, particularly those that require dilation of the blood vessels of the heart. The dosage for such use of course depends on the final concentration and potency of the particular amine (or salt thereof) selected. Thus, when using the compounds utilized in Example 5, as little as 50 milligrams may be administered orally, or as little as 100 milligrams may be administered intravenously.

Many embodiments of this invention may be made without departing from the spirit and scope thereof.

What is claimed is:

1. A substituted amine having the formula

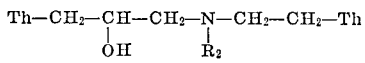

wherein each Th is 7-theophylline or 1-theobromine and $R_2$ is selected from alkyl and hydroxyalkyl groups, wherein each of said alkyl and hydroxyalkyl groups is a straight or branched chain alkyl containing 1–4 carbon atoms.

2. The compounds of claim 1 wherein $R_2$ is selected from the group consisting of hydroxyethyl, isobutyl and n-butyl.

3. The compound of claim 1 named 7-β-hydroxypropyl-theophylline - (7-ethyl-theophylline) - (β-hydroxyethyl)-amine.

4. The compound of claim 1 named 7-β-hydroxypropyl-theophylline-(7-ethyl-theophylline)-isobutylamine.

5. The compound of claim 1 named 7-β-hydroxypropyl-theophylline-(7-ethyl-theophylline)-n-butyl-amine.

6. The compound of claim 1 named 1-β-hydroxypropyl-theobromine - (1-ethyl-theobromine) - (β-hydroxyethyl)-amine.

7. The compound of claim 1 named (1-ethyltheobromine) - (1-β-hydroxypropyltheobromine) - (isobutyl)-amine.

8. The compound of claim 1 named 1-ethyltheobromine - (1 - β - hydroxypropyltheobromine) - butylamine.

9. The compound of claim 1 named (7-ethyltheophylline) - (1 - β - hydroxypropyltheobromine)-(isobutyl)-amine.

References Cited
UNITED STATES PATENTS

| | | | |
|---|---|---|---|
| 3,112,313 | 11/1963 | Kohlstaedt | 260—256 |
| 3,124,579 | 3/1964 | Yoshida et al. | 260—256 |

FOREIGN PATENTS

| | | | |
|---|---|---|---|
| 1,119,868 | 12/1961 | Germany | 260—256 |

ALEX MAZEL, Primary Examiner

A. M. TIGHE, Assistant Examiner

U.S. Cl. X.R.

260—253; 424—253